No. 825,243. PATENTED JULY 3, 1906.
E. H. RIETER-BODMER.
MANUFACTURE OF ARTIFICIAL STONE PIPES, TILES, &c., AND APPARATUS THEREFOR.
APPLICATION FILED SEPT. 26, 1904.
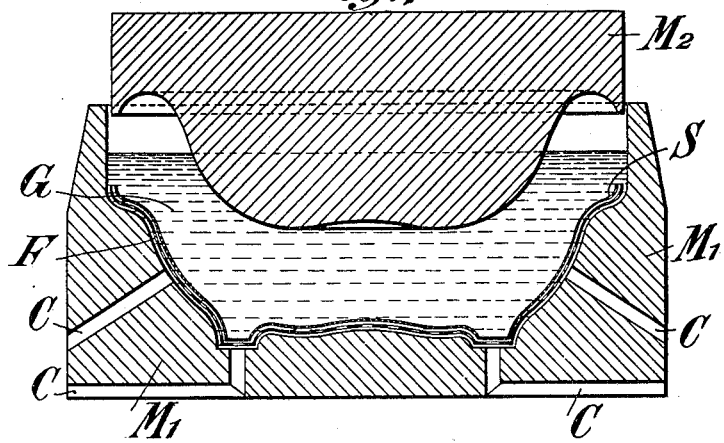
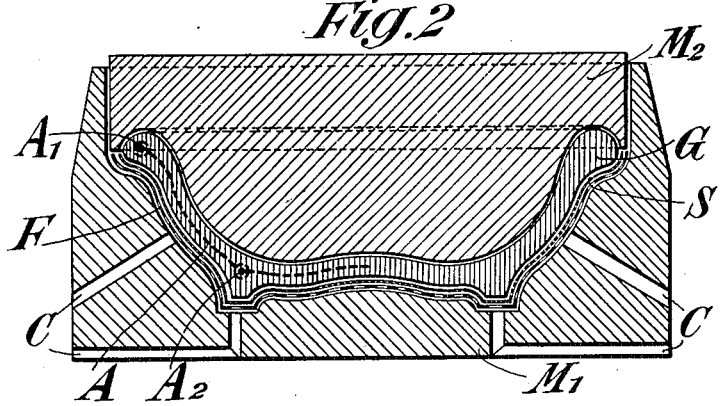
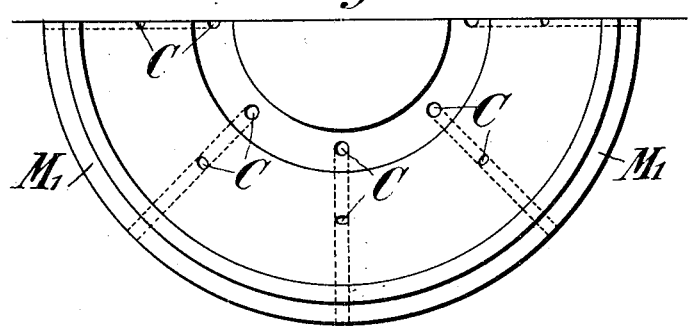
Witnesses:
Inventor:
Emil Henry Rieter-Bodmer

UNITED STATES PATENT OFFICE.

EMIL HENRY RIETER-BODMER, OF KYBURG, SWITZERLAND.

MANUFACTURE OF ARTIFICIAL-STONE PIPES, TILES, &c., AND APPARATUS THEREFOR.

No. 825,243.

Specification of Letters Patent.

Patented July 3, 1906.

Application filed September 26, 1904. Serial No. 226,021.

*To all whom it may concern:*

Be it known that I, EMIL HENRY RIETER-BODMER, a citizen of the Republic of Switzerland, residing at Kyburg, Switzerland, have invented new and useful Improvements in or Relating to the Manufacture of Artificial-Stone Pipes, Tiles, Corrugated Plates, Flat Plates, Relief-Pieces, Vessels, and the Like and in Apparatus Therefor, of which the following is a specification.

This invention has reference to improvements in or relating to the manufacture of artificial-stone pipes, tiles, corrugated plates, flat plates, relief-pieces, vessels, and the like and apparatus therefor, and comprises a process whereby artificial stone or stone-like mass (hereinafter referred to as "stone mass") is rendered completely resistant to the weather and impervious to water and acquires very considerable strength, density, and durability.

Now, this invention has for its object to secure the aforesaid advantages and to enable articles of stone mass to be produced that possess properties rendering them available for many useful purposes. For this purpose asbestos, chrysotile, or some artificial fibrous material reduced to a state of fine division—as by treating it in a centrifugal mill, disintegrator, ball-mill, or edge-runner mill—or to a state of pulp is so incorporated with cement or other hydraulic binding medium and water (for instance, in a boiler-like vessel provided with a stirring device) as to produce a uniform pulp free from lumps, and the mixture is delivered in a well-stirred condition into a mold the walls of which are so lined with fine-wire sieves and provided with holes that on applying the high pressure to which, as subsequently stated, the material is subjected in the mold water will be expelled from the mold on all sides simultaneously and a solid body produced that when dried forms a homogeneous stone mass in which the fibrous material while lying in all directions throughout the mass is also uniformly distributed.

The operation of mixing the fibrous substance with the hydraulic binding medium and with water is preferably carried out simultaneously, and may thus be effected in a few minutes. For producing colored artificial stone suitable coloring material is mixed in at the same time. In some cases for the purpose of further increasing the strength of the article to be produced a sieve-like stiffening of wire or the like is so inserted in the mold as to become embedded in the pressed mass. Such stiffening may also be provided with one or more suitably-arranged stiffening-rings or the like.

The degree of pressure employed may vary according to the purpose for which the article to be produced is required; but in all cases it is very high, and I prefer to employ one of fifteen thousand pounds per square inch or thereabout. The pressed material when dried hardens into a stone mass and by reason of the uniform distribution of the fibers in all directions possesses a thoroughly-uniform strength, hardness, and density. With a high pressure such as mentioned results can be obtained far exceeding those obtainable by the known analogous methods of which I am aware, in which the pressure employed was considerably less. By the means stated I can produce artificial stone which I believe to excel in elasticity and toughness any natural material. Artificial stone has thus been manufactured, for example, having a tensile strength of two and a half tons per square inch, a strength of flexure of three and three-quarter tons per square inch, and a limit of elasticity of three and one-eighth tons per square inch, while the amount of moisture that the material absorbs under a pressure of one atmosphere is only six and a quarter per cent. as compared with twenty per cent. absorbed by clay roofing-tiles, and such absorption of water by the material has not been found to be detrimental to the strength of the material.

Sometimes in order to produce greater smoothness of surface the material after removal from the mold is pressed between heavy metal dies which entirely obliterate all roughness.

By the hereinbefore-described process articles may be produced in any desired dimensions, strength, and shape—as, for example, pottery-ware, pipes, picture-frames, troughs, tiles, rods of special sections for wall and ceiling decorations, plates, panels, relief-pieces, ornaments, artificial slates, &c. Articles in the form of bars and plates made according to the herein-described process show no tendency to subsequent warping, as is the case in a high degree with those processes where similar masses are produced on cylindrical surfaces and have then subsequently to be rolled or otherwise flattened.

A further important advantage of stone mass produced according to this process or of the articles formed therefrom is that each surface is smooth and clean. Moreover, the material can be readily worked—as, for example, by sawing, planing, drilling, stamping, or punching—and takes a high polish in any color. The material is also adapted for use as a bad conductor of heat, a protection against moisture, vermin, rot, and fungus for internal panelings, and being also absolutely incombustible there is no risk from fire. It forms also a good insulating material for electrical purposes.

The accompanying drawings illustrate one example of the production of dish or basin according to this invention.

Figure 1 is a vertical section of the mold containing the pulp in the unpressed condition. Fig. 2 is a similar view showing the mold after the application of pressure and with the pressed mass located between the male and female portions of the mold. Fig. 3 is a half-plan of the mold.

In the example the female part of the mold is formed with a thick wall M', adapted to resist considerable pressure and provided with rows of holes circumferentially arranged, each hole communicating with a separate conduit or passage C, formed in the wall of the mold, whereby the expelled water may readily escape. In the particular example cited there are provided two rows of eight holes each. The female part of the mold is further provided over the greater part of its internal surface with an inner wire sieve S and an outer perforated plate F, of which the sieve has a fineness of from one hundred and fifty to one hundred and eighty meshes per square centimeter, while the perforated plate is somewhat coarser.

Suitably located in the mold is a sieve-like stiffener A, of corresponding shape to that of the article to be produced, formed of wire and provided with stiffening-rings A' and A². When such a stiffener is required, I first put into the mold only a portion of the pulp required for the article and subject it to comparatively slight pressure, then place the stiffener (which may be in one or more pieces) in position, add the remainder of the pulp, and finally press the whole. The male part of the mold is formed of a smooth-faced metal block M², shaped to correspond to the shape of the mold, the arrangement being such that on pressing the pulp G between the two parts of the mold the superfluous water will be expressed uniformly in all directions from the mold and a homogeneous mass produced.

Having now particularly described and ascertained the nature of the said invention and in what manner the same is to be performed, I declare what I claim is—

Apparatus for the manufacture of artificial-stone articles from liquid-cement mixtures, comprising a rigid metal mold having drainage-passages leading from the molding-face of the mold to the exterior thereof, a complementary form to be pressed into the same and a liner for said mold composed of superposed wire nets of different-sized mesh, the coarsest net lying next to the face of the mold, said nets mutually supporting each other and forming drainage-passages between the article being molded and the face of the mold whereby the liquid expressed will be drained to and through the perforations.

In testimony whereof I have signed my name to this specification in the presence of two subscribing witnesses.

EMIL HENRY RIETER-BODMER.

Witnesses:
A. LIEBERKNECHT,
EMIL BLUM.